US011927832B2

(12) United States Patent
Zheng

(10) Patent No.: US 11,927,832 B2
(45) Date of Patent: Mar. 12, 2024

(54) MAGNETIC ATTRACTION TYPE LENS-REPLACEABLE EYEGLASSES

(71) Applicant: WENZHOU TIDE-OPTICAL CO., LTD., Wenzhou (CN)

(72) Inventor: Leping Zheng, Wenzhou (CN)

(73) Assignee: WENZHOU TIDE-OPTICAL CO., LTD, Zhejiang (CN)

(*) Notice: Subject to any disclaimer, the term of this patent is extended or adjusted under 35 U.S.C. 154(b) by 209 days.

(21) Appl. No.: 17/363,945

(22) Filed: Jun. 30, 2021

(65) Prior Publication Data

US 2022/0382072 A1 Dec. 1, 2022

(30) Foreign Application Priority Data

May 27, 2021 (CN) .......................... 202121153751.9

(51) Int. Cl.
*G02C 3/00* (2006.01)
*G02C 5/04* (2006.01)

(52) U.S. Cl.
CPC ................. *G02C 3/00* (2013.01); *G02C 5/04* (2013.01); *G02C 2200/02* (2013.01); *G02C 2200/06* (2013.01); *G02C 2200/08* (2013.01)

(58) Field of Classification Search
CPC ........ G02C 3/00; G02C 5/04; G02C 2200/02; G02C 2200/06; G02C 2200/08; G02C 2200/04; G02C 1/04; G02C 5/02; G02C 5/126; G02C 5/146; G02C 1/02; G02C 5/2209; G02C 5/10; G02C 5/22; G02C 1/10; G02C 5/006; G02C 2200/18; G02C 9/02; G02C 5/2272; G02C 5/08; G02C 1/023; G02C 5/2281

(Continued)

(56) References Cited

U.S. PATENT DOCUMENTS 6,352,342 B1 * 3/2002 Huang ..................... G02C 9/00
351/57
7,048,372 B1 * 5/2006 Cohen ..................... G02C 9/04
351/44

(Continued)

FOREIGN PATENT DOCUMENTS

WO WO-2004083941 A1 * 9/2004 ............. A61F 9/025

OTHER PUBLICATIONS

Oxford Languages, "Matched" Definition, 2023, Google (Year: 2023).*

*Primary Examiner* — Wyatt A Stoffa
*Assistant Examiner* — Ray Alexander Dean
(74) *Attorney, Agent, or Firm* — Christensen, Fonder, Dardi & Herbert PLLC

(57) ABSTRACT

A magnetic attraction type lens-replaceable eyeglasses, comprising a frame and lenses. A connector for fixedly connecting the lenses to the frame is disposed at a bridge of the frame. The connector is detachably connected to the frame. The connector and the frame are in magnetic attraction cooperation. Fixing pins capable of penetrating through the lenses and used for limiting the swing of the lenses are disposed on the side, in contact with the lenses, of the connector. By using the detachable connector, the lenses are fixed to the frame. By means of magnetic attraction cooperation, the lenses can be relatively easy to replace. Meanwhile, by using a design of positioning pins, it can be ensured that the lenses mounted on the frame will not swing or shift.

14 Claims, 12 Drawing Sheets

(58) Field of Classification Search
USPC .......................................................... 351/128
See application file for complete search history.

(56) References Cited

U.S. PATENT DOCUMENTS

| | | | | |
|---|---|---|---|---|
| 7,244,023 B1* | 7/2007 | Hsiao | ........................ | G02C 9/00 |
| | | | | 351/57 |
| 2008/0137028 A1* | 6/2008 | Webb | ........................ | G02C 1/04 |
| | | | | 351/106 |
| 2014/0333890 A1* | 11/2014 | Xia | ........................ | G02C 11/10 |
| | | | | 351/158 |

* cited by examiner

MAGNETIC ATTRACTION TYPE LENS-REPLACEABLE EYEGLASSES

PRIORITY CLAIM

The present application claims priority to Chinese Patent Application No. 2021211537519, filed on May 27, 2021, which said application is incorporated by reference in its entirety herein.

TECHNICAL FIELD

The present invention belongs to the technical field of eyeglasses, and particularly relates to magnetic attraction type lens-replaceable eyeglasses.

BACKGROUND

Eyeglasses are apparatuses with lenses of different optical properties to correct eyesight and to protect user's eyes against injuries by high-intensity light. One pair of existing eyeglasses include a frame and two lenses. These two lenses are disposed on the frame, spaced and corresponding to two user's eyes, respectively, to correct eyesight and to protect eyes.

However, mostly, lenses of existing eyeglasses are directly fixed by a frame. As a result, the lenses need to fit the frame in shape, and generally, a professional tool is needed to replace the lenses. Ordinary users are not very good at replacing lenses. When lenses of different functions are needed, current common ways include preparing alternative eyeglasses and preparing add-on-mode lenses. In the first way, more than one pair of eyeglasses needs to be carried about. In the other way, the add-on-mode lenses can increase the weight of eyeglasses, causing higher pressure to a nose bridge.

To solve the above problems, replaceable lenses are provided. If magnetic attraction pieces are disposed on a frame and lenses, respectively, they attract each other in cooperation, however, this cooperation completely depends on magnetic attraction force on the frame and lens frames, and the lenses can be knocked off easily.

SUMMARY

To overcome the defects in the prior art, an objective of the present invention is to provide magnetic attraction type lens-replaceable eyeglasses.

To realize the above objective, the present invention provides a technical solution as below. The magnetic attraction type lens-replaceable eyeglasses include a frame and lenses. A connector for fixedly connecting the lenses to the frame is disposed at a bridge of the frame. The connector is detachably connected to the frame. The connector and the frame are in magnetic attraction cooperation. Fixing pins capable of penetrating through the lenses and used for limiting the lenses to swing are disposed on the side, in contact with the lenses, of the connector.

A slot is circumferentially formed in an inner side of the frame. The lenses can be embedded in the slot.

The slot extends from two ends of the frame to a surface of the bridge. A middle section of the lenses is located on the surface of the bridge when the lenses are inserted in the slot.

Positioning holes matched with the fixing pins are formed in the bridge.

A first groove is formed in the bridge. A first magnetic piece is disposed in the first groove. A second groove is formed in the side, in contact with the lenses, of the connector. A second magnetic piece is disposed in the second groove. The first magnetic piece and the second magnetic piece are in magnetic attraction cooperation when the connector is in contact with the frame.

Inner surfaces of the lenses fit an outer surface of the frame.

Through-holes for the fixing pins to penetrate through are formed in the lenses.

The fixing pins are several, and are symmetrically disposed on the connector.

Any one edge of the connector extends to an outer side of the bridge to form an operation part for detaching the connector.

An upper side of the connector is higher than a surface of the frame when the connector is mounted on the bridge.

The present invention has the beneficial effects: by using the detachable connector, the lenses are fixed to the frame; by means of magnetic attraction cooperation, the lenses can be relatively easy to replace; and meanwhile, by using a design of positioning pins, it can be ensured that the lenses mounted on the frame will not swing or shift.

DETAILED DESCRIPTION OF THE INVENTION

Figure 1:
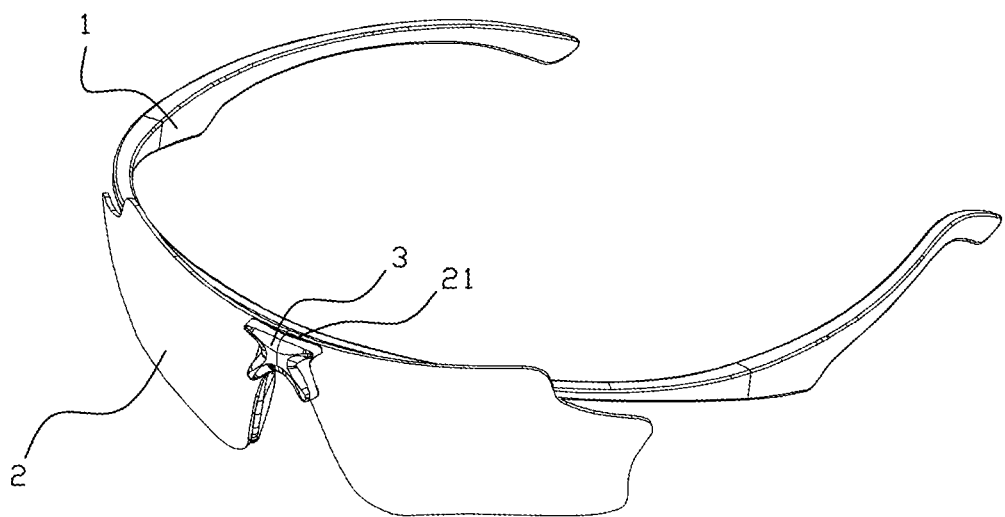
FIG. 1 is a structural schematic diagram according to Embodiment 1.

The following will clearly and completely describe the technical solutions in examples of the present invention with reference to the accompanying drawings in examples of the present invention. It is obvious that the described examples are only a few, but not all, examples of the present invention. All the other examples implemented by those of ordinary skill in the art based on the examples in the present invention without any inventive efforts all belong to the protection scope of the present invention.

It should be noted that all directional indications (such as up, down, left, right, front, back . . . ) in examples of the present invention are merely intended to interpret relative positional relationships and movement situations of all parts in a certain specific posture (as shown in the accompanying drawings). If such specific posture changes, the directional indications change accordingly.

In the present invention, unless otherwise expressly stipulated and qualified, the terms "connected", "fixed", etc.

should be understood broadly, e.g., "fixed" can be fixedly connected, can also be detachably connected or integrally connected; can be mechanically connected, can also be connected; can be directly connected, can also be indirectly connected by a link, can be internal communication between two components or an interactive relationship between two components, unless otherwise expressly qualified. Those of ordinary skill in the art can understand the specific meanings of the aforesaid terms in the present invention in particular cases.

Further, the terms "first", "second", etc. involved in the present invention are merely used for description and cannot be construed as indicating or implying relative importance or implicitly indicating the number of the technical features indicated. Therefore, the features defined as "first" and "second" can expressly or implicitly include at least one such feature. Further, combinations of technical solutions among all examples can be realized, but they must be realizable to those of ordinary skill in the art. When a combination of technical solutions conflicts or cannot be realized, it should be appreciated that this combination of technical solutions does not exist and neither is it within the protection scope of claims of the present invention.

As shown in FIGS. 1-11, the present invention discloses magnetic attraction type lens-replaceable eyeglasses, comprising a frame 1 and lenses 2, where the quantity of lenses 2 is generally two. The lenses 2 involved in the present application are two symmetrical lenses. The two lenses are connected with each other. A joint of the two lenses is matched with a bridge 16 of the frame. The bridge of the frame extends towards a lower end to form a mounting platform surface 13. A middle section 21 of the lenses is disposed on the mounting platform surface 13. Meanwhile, the mounting platform surface 13 extends towards two lower sides to form nose pads 17. In addition, the nose pads can be integrally formed, and can also be of a split type structure. A connector 3 for fixedly connecting the lenses 2 to the frame 1 is disposed at the bridge 16 of the frame 1. The connector 3 is detachably connected to the frame 1. The connector 3 and the frame 1 are in magnetic attraction cooperation. Fixing pins 33 capable of penetrating through the lenses 2 and used for limiting the lenses 2 to swing are disposed on the side, in contact with the lenses 2, of the connector 3. That is, the lenses 2, when disposed on the mounting platform surface 13, can be limited at this position by using the connector 3 such that the assembling of the lenses 2 and the frame 1 is completed, and mounting is convenient and rapid.

Figure 2:
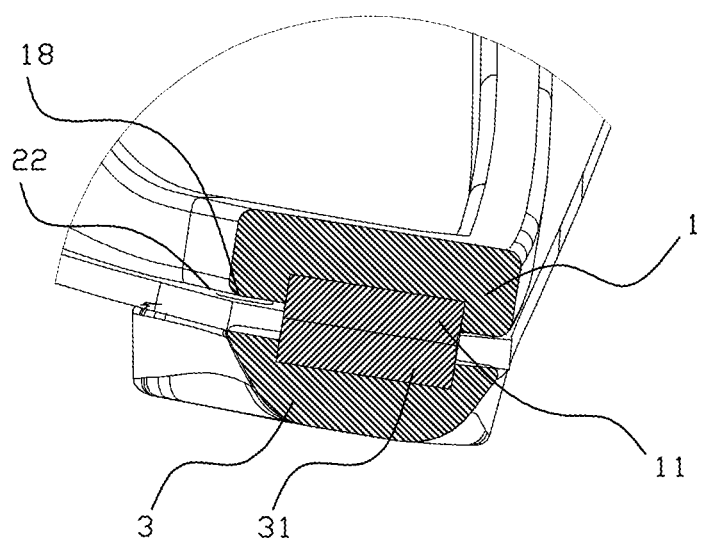
FIG. 2 is a sectional view of a bridge according to Embodiment 1.
Figure 3:
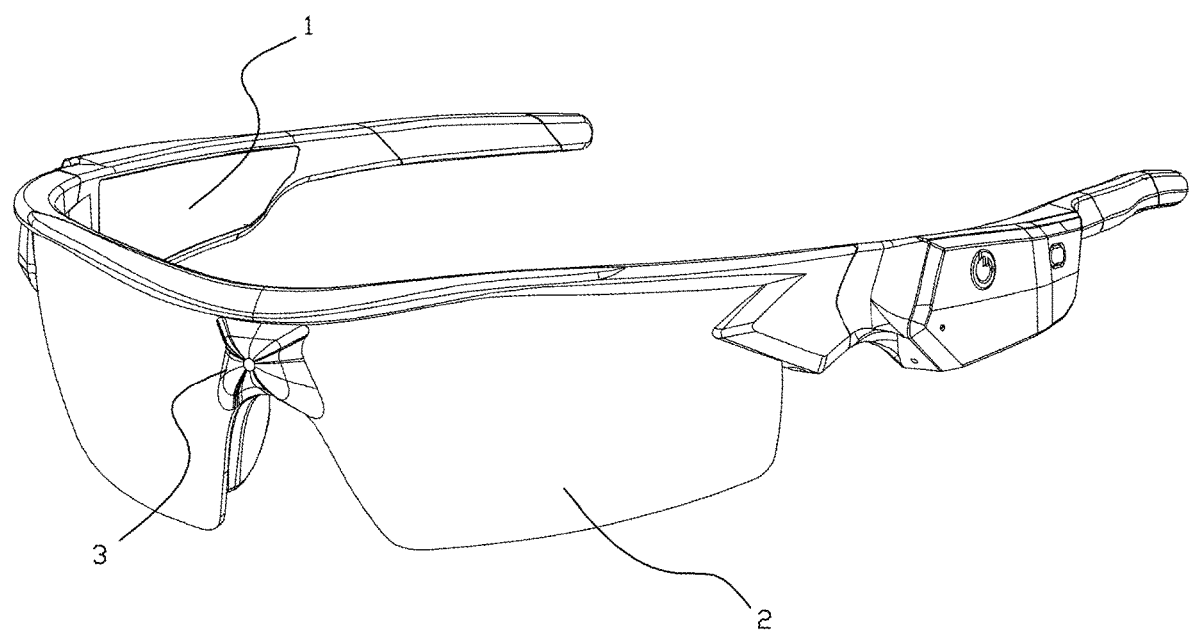
FIG. 3 is a structural schematic diagram according to Embodiment 2.
Figure 4:
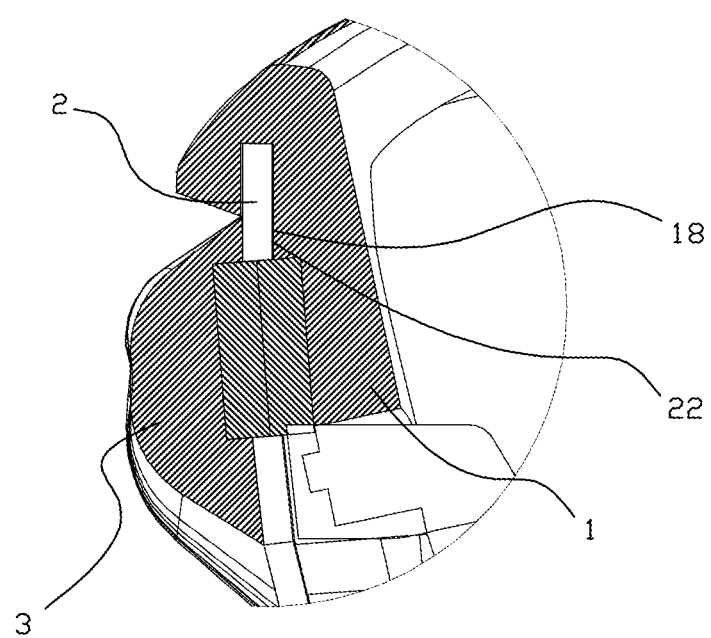
FIG. 4 is a sectional view of a bridge according to Embodiment 2.
Figure 5:
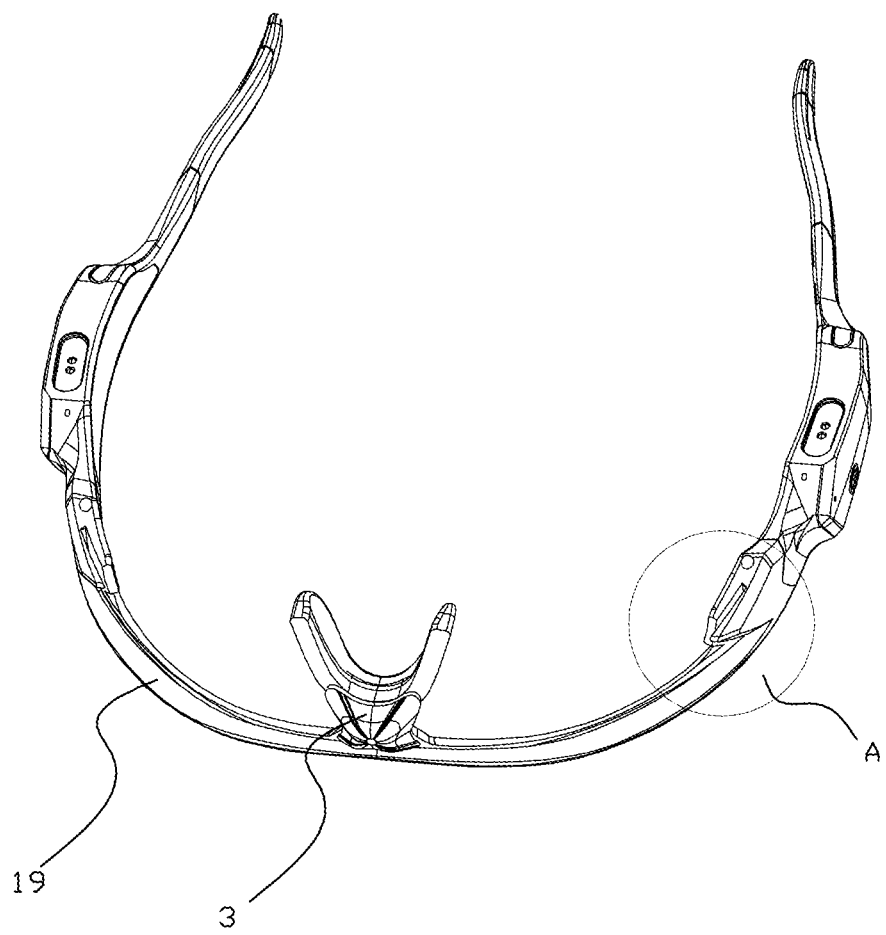
FIG. 5 is a structural schematic diagram of a frame according to Embodiment 2.
Figure 6:
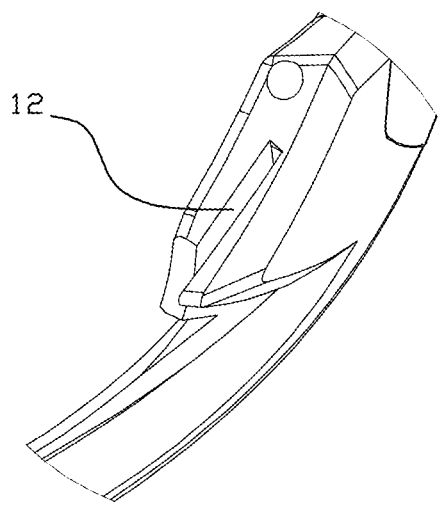
FIG. 6 is an inflated view of the position A in FIG. 5.
Figure 7:
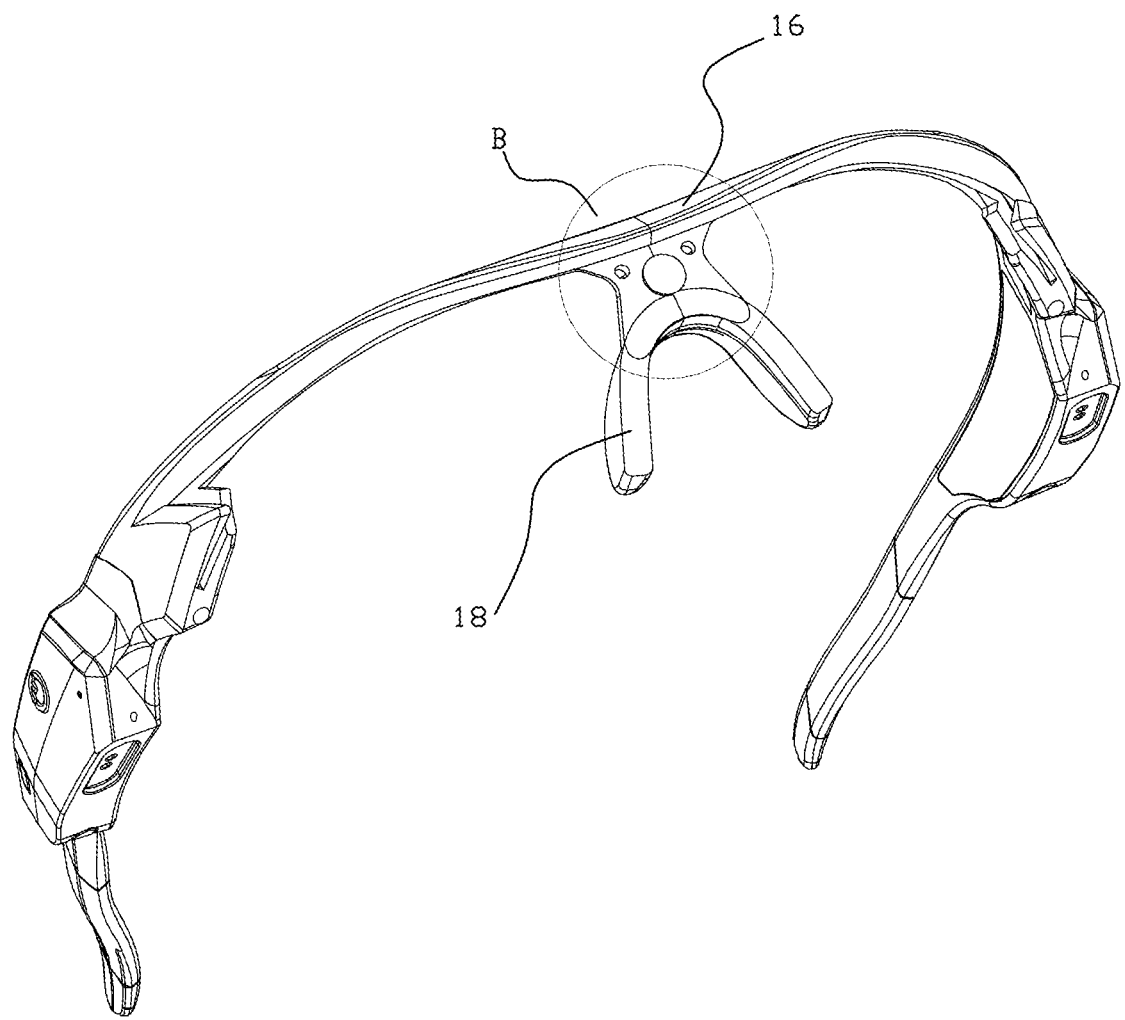
FIG. 7 is a structural schematic diagram of another angle of a frame according to Embodiment 2.
Figure 8:
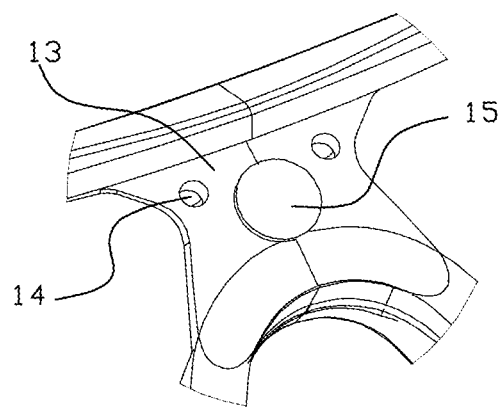
FIG. 8 is an inflated view of the position B in FIG. 7.
Figure 9:
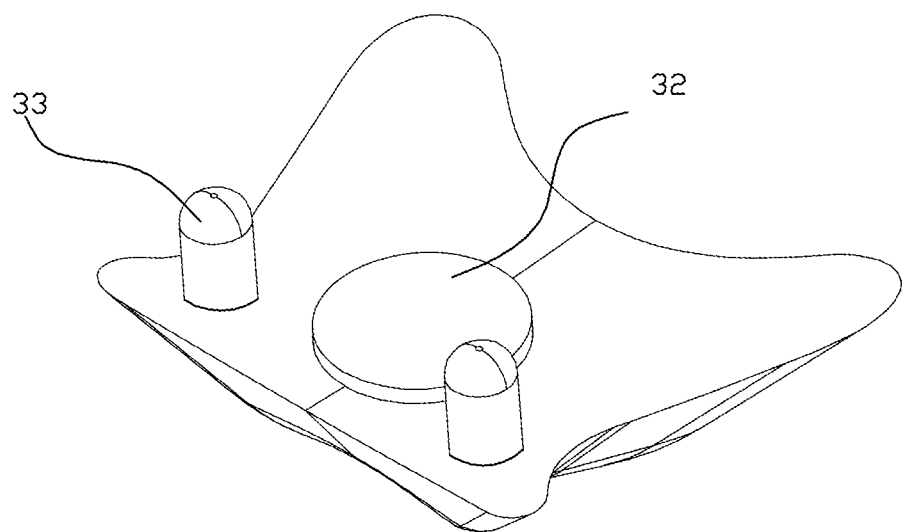
FIG. 9 is a structural schematic diagram of a connector.
Figure 10:
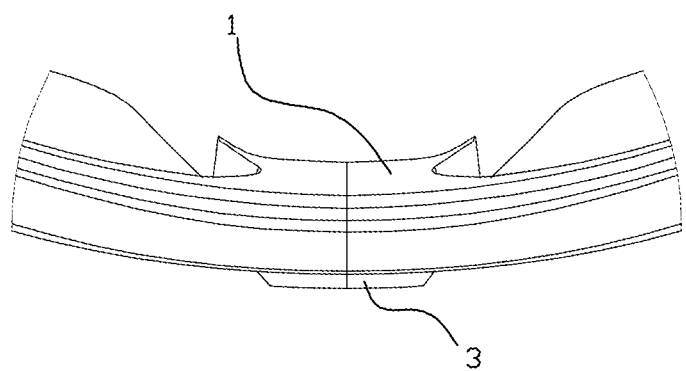
FIG. 10 is a bottom view of a connector and a bridge in cooperation.
Figure 11:
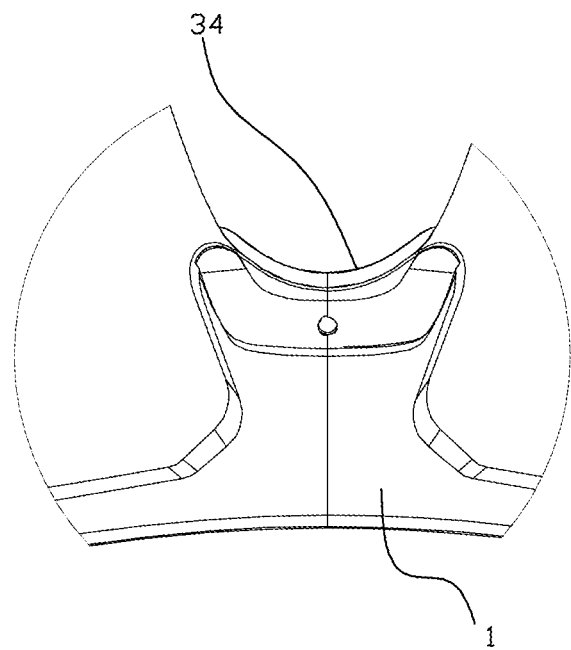
FIG. 11 is a rear view of a connector and a bridge in cooperation.
Figure 12:
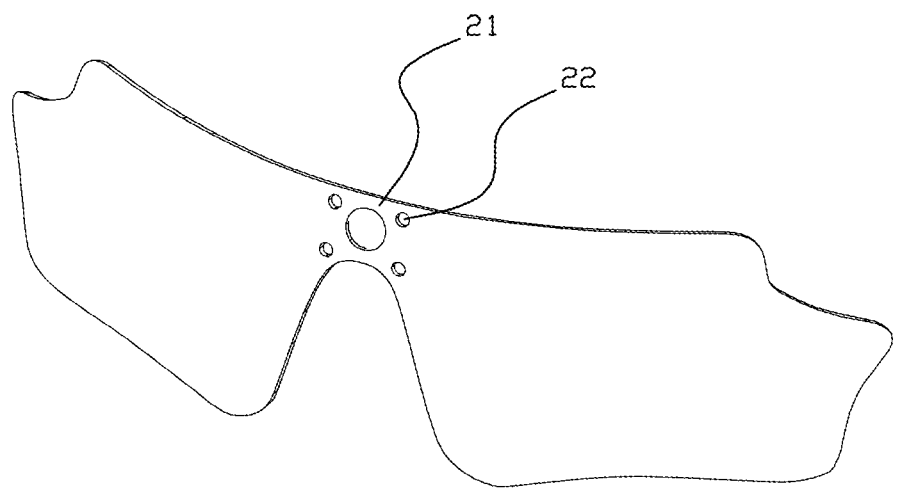
FIG. 12 is a structural schematic diagram of lenses.

Embodiment 1: Referring to FIGS. 1-2, the lenses 2 are directly pressed on the frame 1, and inner surfaces 22 of the lenses 2 are pressed on an outer surface 18 of the frame, i.e., bending radii of the lenses 2 and the frame 1 are matched, so it can be ensured that the lenses 2 completely or almost completely fit the frame 1, and then the lenses 2 are fixedly disposed on the frame 1 by using the connector 3.

Embodiment 2: A slot 12 is circumferentially formed in an inner side 19 of the frame 1, and the lenses 2 can be embedded in the slot 12. The slot 12 extends from two ends of the frame 1 to a surface of the bridge 16, a middle section of the lenses 2 are located on the surface of the bridge 16 when the lenses 2 are inserted in the slot 12, i.e., the slot 12 is formed in the part, matched with the lenses 2, of the frame 1, the lenses 2 are inserted into a frame side of the frame 1 along the slot 12, and the slot 12 extends to the surface of the bridge 16, so it can be ensured that the middle section of the lenses 2 is located on the surface of the bridge 16 after the lenses 2 are inserted into the frame 1, and then the lenses 2 are fixed by using the connector 3.

In the two embodiments, the lenses 2 are fixed to the frame 1 by using the connector 3, the connector 3 is detachable relative to the frame 1, i.e., the connector 3 can be taken down from the frame 1 as a whole, a first groove 15 is formed in the bridge 16, a first magnetic piece 11 is disposed in the first groove 15, a second groove 32 is formed in the side, in contact with the lenses 2, of the connector 3, a second magnetic piece 31 is disposed in the second groove 32, and the first magnetic piece 11 and the second magnetic piece 31 are in magnetic attraction cooperation when the connector is in contact with the frame. Further, a magnetic piece 11 or 31 can be disposed in any one groove 15 or 32, and a metal piece attractable by the magnetic piece can be disposed in the other corresponding groove, as long as fixation firmness of the two pieces is guaranteed. The lenses 2 are fixed by using the connector 3 in the middle, the lenses 2 may swing left and right easily. To solve the problem, fixing pins 33 are disposed at a bottom of the connector 3, positioning holes 14 matched with the fixing pins 33 are formed in the bridge 16, and through-holes 22 for the fixing pins 33 to penetrate through are formed in the lenses 2. The fixing pins 33 can penetrate through the lenses 2 to be matched with the positioning holes 14 in the frame 1. Due to the left-right symmetrical arrangement, the positions of the lenses 2 can be limited, and the lenses 2 are prevented from swinging.

Further, the several fixing pins 33 can be arranged, to further improve a fixation effect and to ensure a fixation reliability of the lenses 2.

Any one edge of the connector 3 extends to an outer side of the bridge 16 to form an operation part 34 for detaching the connector 3. That is, a dimension of the connector 3 is slightly larger than that of the bridge 16, and a part of the connector 3 is exposed outside to form the operation part 34 after the connector is mounted in place, so detaching is easy.

An upper side of the connector is higher than a surface of the frame 1 when the connector 3 is mounted on the bridge 16, so a part operable during detaching is enlarged.

Examples should not be deemed as limitations to the present invention, but the improvements made on the basis of the spirit of the present invention should all be within the protection scope of the present invention.

The invention claimed is:

1. Magnetic attraction type lens-replaceable eyeglasses, comprising:
   a frame;
   lenses;
   a connector for fixedly magnetically connecting the lenses to the frame is disposed at a bridge of the frame, the connector being detachably connected to the frame, the connector and the frame being in magnetic connection, and
   fixing pins disposed on the connector and in contact with the lenses, the fixing pins configured to penetrate through the lenses, and used for limiting a swing of the lenses;
   wherein the bridge defines positioning holes positioned and configured to receive the fixing pins, and the connector is releasable from the lenses by breaking the magnetic connection between the connector and the frame.

2. The magnetic attraction type lens-replaceable eyeglasses according to claim 1, wherein a slot is circumferentially formed in an inner side of the frame, and the lenses are embedded in the slot.

3. The magnetic attraction type lens-replaceable eyeglasses according to claim 2, wherein the slot extends from two ends of the frame to a surface of the bridge, and a middle section of the lenses is located on the surface of the bridge when the lenses are inserted in the slot.

4. The magnetic attraction type lens-replaceable eyeglasses according to claim 1, wherein a first groove is formed in the bridge, a first magnetic piece is disposed in the first groove, a second groove is formed in a side, in contact with the lenses, of the connector, a second magnetic piece is disposed in the second groove, and the first magnetic piece and the second magnetic piece are in magnetic attraction cooperation when the connector is in contact with the frame.

5. The magnetic attraction type lens-replaceable eyeglasses according to claim 1, wherein inner surfaces of the lenses fit an outer surface of the frame.

6. The magnetic attraction type lens-replaceable eyeglasses according to claim 1, wherein through-holes for the fixing pins to penetrate through are formed in the lenses.

7. The magnetic attraction type lens-replaceable eyeglasses according to claim 1, wherein the fixing pins are plural, and are symmetrically disposed on the connector.

8. The magnetic attraction type lens-replaceable eyeglasses according to claim 1, wherein any one edge of the connector extends to an outer side of the bridge to form an operation part for detaching the connector.

9. The magnetic attraction type lens-replaceable eyeglasses according to claim 2, wherein positioning holes matched with the fixing pins are formed in the bridge.

10. The magnetic attraction type lens-replaceable eyeglasses according to claim 3, wherein positioning holes matched with the fixing pins are formed in the bridge.

11. The magnetic attraction type lens-replaceable eyeglasses according to claim 2, wherein a first groove is formed in the bridge, a first magnetic piece is disposed in the first groove, a second groove is formed in a side, in contact with the lenses, of the connector, a second magnetic piece is disposed in the second groove, and the first magnetic piece and the second magnetic piece are in magnetic attraction cooperation when the connector is in contact with the frame.

12. The magnetic attraction type lens-replaceable eyeglasses according to claim 3, wherein a first groove is formed in the bridge, a first magnetic piece is disposed in the first groove, a second groove is formed in a side, in contact with the lenses, of the connector, a second magnetic piece is disposed in the second groove, and the first magnetic piece and the second magnetic piece are in magnetic attraction cooperation when the connector is in contact with the frame.

13. The magnetic attraction type lens-replaceable eyeglasses according to claim 6, wherein the fixing pins are plural, and are symmetrically disposed on the connector.

14. The magnetic attraction type lens-replaceable eyeglasses according to claim 1, wherein the fixing pins are disposed on sides of the connector.

\* \* \* \* \*